United States Patent
Gee et al.

(10) Patent No.: US 12,491,392 B2
(45) Date of Patent: Dec. 9, 2025

(54) WATER AND ELECTRICAL SUPPLY SYSTEM FOR FIREFIGHTING

(71) Applicant: Twin Disc, Inc., Racine, WI (US)

(72) Inventors: Michael B. Gee, Kenosha, WI (US); Nick D. Derus, Milwaukee, WI (US)

(73) Assignee: Twin Disc, Inc., Racine, WI (US)

( * ) Notice: Subject to any disclaimer, the term of this patent is extended or adjusted under 35 U.S.C. 154(b) by 395 days.

(21) Appl. No.: 18/097,341

(22) Filed: Jan. 16, 2023

(65) Prior Publication Data
US 2023/0226395 A1   Jul. 20, 2023

Related U.S. Application Data

(60) Provisional application No. 63/299,656, filed on Jan. 14, 2022.

(51) Int. Cl.
| | |
|---|---|
| *A62C 31/28* | (2006.01) |
| *A62C 27/00* | (2006.01) |
| *E03B 9/04* | (2006.01) |
| *H01R 13/516* | (2006.01) |
| *H01R 13/52* | (2006.01) |
| *H02J 50/10* | (2016.01) |

(52) U.S. Cl.
CPC .............. *A62C 31/28* (2013.01); *A62C 27/00* (2013.01); *E03B 9/04* (2013.01); *H01R 13/516* (2013.01); *H01R 13/5205* (2013.01); *H02J 50/10* (2016.02)

(58) Field of Classification Search
CPC .. H01R 13/516; H01R 13/5205; A62C 27/00; A62C 35/20; A62C 31/28; A62C 31/05; A62C 35/68; A62C 37/04; H02J 50/10; E03B 9/04; B05B 9/0423
See application file for complete search history.

(56) References Cited

U.S. PATENT DOCUMENTS

| | | | | |
|---|---|---|---|---|
| 4,332,681 A | * | 6/1982 | Jambry | E03F 5/041 |
| | | | | 137/236.1 |
| 2020/0384296 A1 | * | 12/2020 | Sitnikov | E03B 9/06 |
| 2021/0138281 A1 | * | 5/2021 | Nohmi | B64F 3/02 |

* cited by examiner

*Primary Examiner* — Christopher R Dandridge
(74) *Attorney, Agent, or Firm* — Boyle Fredrickson, S.C.

(57) ABSTRACT

A water and electrical supply system for firefighting may provide both a supply of water and electrical power that are usable by a load device(s), such as an electric pumping system or a battery charging system of a firefighting vehicle such as a fire engine. An electrical connector may be mounted in a connector housing, which may be supported by a hydrant. The electrical connector may be de-energized in a default non-use state.

9 Claims, 9 Drawing Sheets

WATER AND ELECTRICAL SUPPLY SYSTEM FOR FIREFIGHTING

CROSS-REFERENCE TO RELATED APPLICATIONS

This application claims priority to U.S. Provisional Patent Application No. 63/299,656, filed on Jan. 14, 2022, and entitled "Water and Electrical Supply System for Firefighting", the entirety of which is expressly incorporated by reference herein.

BACKGROUND OF THE INVENTION

Field of the Invention

The preferred embodiments relate generally to the field of firefighting vehicles and, more specifically, to a water and electrical supply system for use with firefighting vehicles that use electric motors to provide power to various vehicle systems.

Discussion of the Related Art

The electrification of vehicle drivetrains is growing increasingly popular. Using electrical power for vehicle propulsion can be done in numerous ways by implementing a variety of electrical power-based drivetrain configurations. Examples include hybrid electric vehicles (HEVs) that primarily use relatively small internal combustion (IC) engines for power and electric motors to assist the IC engines, when needed. Plug-in hybrid electric vehicles (PHEVs) typically have larger battery banks than HEVs and rely less on their IC engines for power during ordinary driving. All-electric or fully-electric vehicles (EVs) typically have even larger battery banks and are powered solely by electricity.

The types of vehicles that use electrical power for propulsion is also growing more diverse over time. Although early examples were typically small passenger vehicles, recent efforts have been made to configure substantially larger and more complex vehicles to utilize electrical power for propulsion. At least some of the larger and more complex vehicles may have numerous accessories or systems that require substantial amounts of power. These accessories or systems are typically driven by vehicle IC engines, such as high-horsepower diesel engines of the vehicles' powertrains. Many of the accessories or systems are used for extended periods of time, including times during which the vehicles are not moving. Examples include various firefighting vehicles, such as fire engines or pumper trucks that use the vehicles' IC engine to power their pumps during firefighting activities. Attempts to utilize EV-type fire engines have proven challenging because battery storage is limited, and the amount of time and therefore electrical power needed during a firefighting event cannot be determined.

What is therefore needed is a system that allows an EV-type fire engine to reliably pump water or other firefighting agent, regardless of duration, during a firefighting event and without overly depleting electrical storage in a battery bank(s) in a manner that could compromise the fire engine's drivability.

SUMMARY AND OBJECTS OF THE INVENTION

The preferred embodiments overcome the above-noted drawbacks by providing a firefighting accessory that can supply electrical power to sub-systems and as is otherwise needed by a fire engine. This may be implemented as a water and electrical supply system for firefighting, which may combine features for delivering both water and electrical power to the fire engine.

The water and electrical supply system may include a water supply system with a water inlet that receives the water from an upstream water supply. An electrical supply system may include a set of conductors for electrically connecting the electrical system to an electrical power source.

The water supply system may be implemented as a fire hydrant having a hydrant barrel that defines a barrel passage that is configured to direct water from the hydrant's water inlet to its outlet. The electrical conductors may extend along the hydrant barrel to an electrical connector assembly that may be supported by the fire hydrant. The electrical connector assembly may include a connector housing that is sealed out of fluid communication from the barrel passage. The hydrant barrel may include at least one conduit support against which an electrical conduit may mount. The electrical conductors extend through the electrical conduit to connect the electrical connector assembly to receive power from the electrical power source. through which the electrical conductors extend. The conduit support(s) may be inside the hydrant barrel so that the electrical conduit is mounted internally within the hydrant.

The connector housing may define a housing enclosure with a main body provided by interconnected housing walls. A housing enclosure door can move to an open position that permits access to an interior of the housing enclosure and a closed position that prevents access to the housing interior. A cord seal may be mounted to the housing enclosure and/or the enclosure door to provide a sealed interface between them when an accessory power cord is connected to an electrical connector in the connector housing. The cord seal may provide a liquid-tight seal and it may be arranged at a lower wall of the housing enclosure.

These, and other aspects and objects of the present invention, will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical embodiments of the present invention, will become more readily apparent by referring to the exemplary and, therefore, non-limiting, embodiments illustrated in the drawings accompanying and forming a part of this specification, wherein like reference numerals designate the same elements in the several views, and in which.

Figure 1:
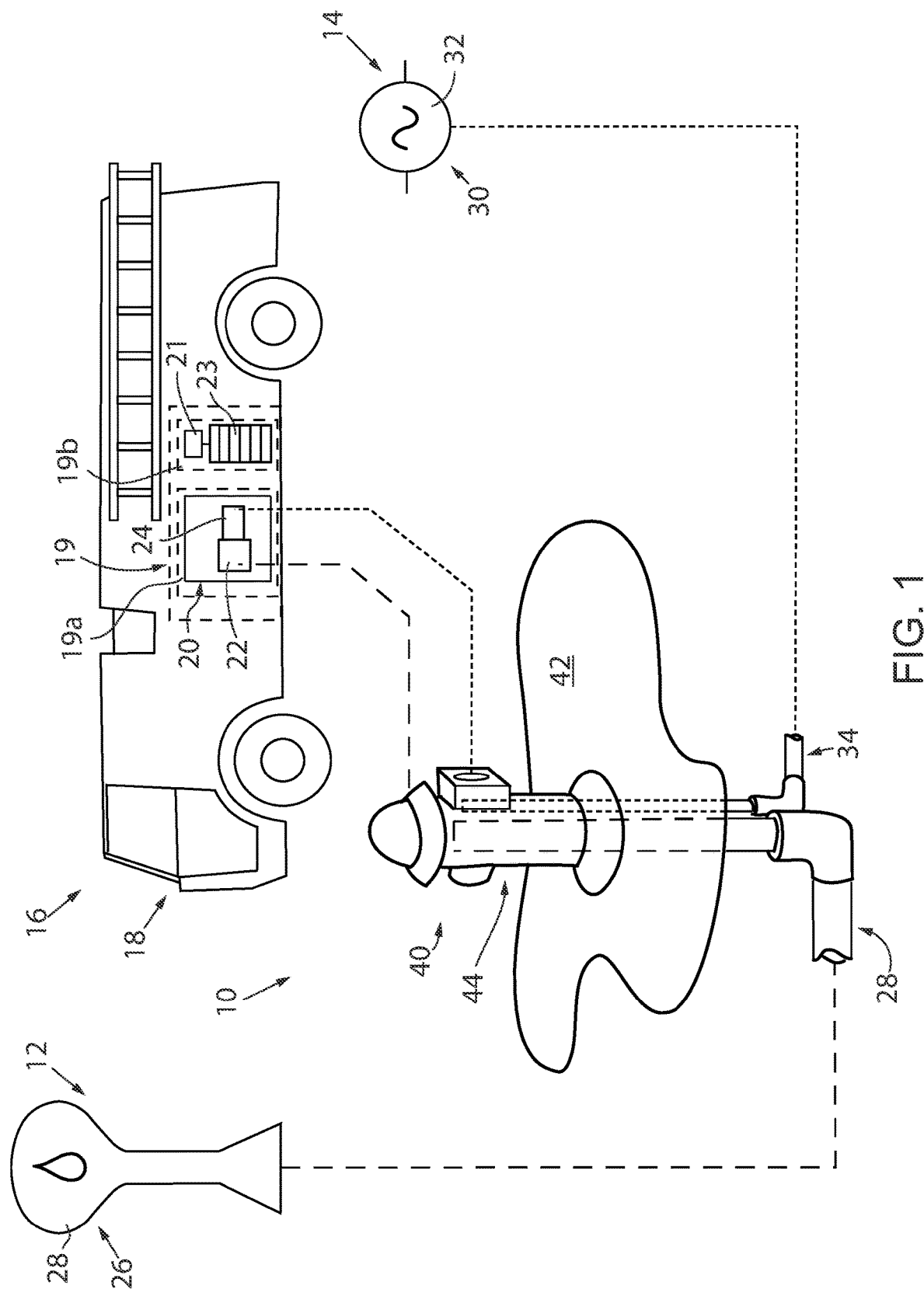
FIG. 1 is a schematic illustration of part of a firefighting scene with a water and electrical supply system for firefighting, according to a preferred embodiment.

In describing preferred embodiments of the invention, which are illustrated in the drawings, specific terminology will be resorted to for the sake of clarity. However, it is not intended that the invention be limited to the specific terms so selected, and it is to be understood that each specific term includes all technical equivalents, which operate in a similar manner to accomplish a similar purpose. For example, the words "connected", "attached", "coupled", or terms similar thereto are often used. They are not limited to direct connection but include connection through other elements where such connection is recognized as being equivalent by those skilled in the art.

DETAILED DESCRIPTION OF PREFERRED EMBODIMENTS

Referring to FIG. 1, one embodiment of the invention is a water and electrical supply system for a firefighting system 10. The system 10 includes both a water supply system 12 and an electrical supply system 14 that collectively provide water and electrical power to a firefighting device 16. The firefighting device 16 may be, for example, a firefighting vehicle, shown here as a pumper truck or fire engine 18 that receives water from the water supply system 12 and typically pumps the water (or other firefighting agent) to a ladder truck or fire truck that delivers the water for extinguishing a fire. Fire engine 18 includes at least one electrical load 19 that is powered by system 10. Electrical load(s) 19 may include an electrical accessory system 19a and an electrical charging system 19b, both of which may consume power from electrical supply system 14.

Still referring to FIG. 1, electrical accessory system 19a is shown here with an electric firefighting accessory, represented as electric pumping system 20. The electric pumping system 20 includes a pump 22 that receives the water from water supply system 12 and pumps it in a downstream direction to a fire truck (not shown) or other device. An electric motor 24 of electric pumping system 20 is implemented as a prime mover that is connected to or otherwise drives the pump 22. Electric motor 24 is typically a high-voltage motor, such as 240V single-phase, and is capable of driving pump 22, which has a flow-rate of a PTO driven pump or a split-shaft driven pump flow rating of between about 300-800 gallons per minute, optionally a higher rate. It is understood that electric pumping system 20 may be implemented in a fire engine 18 that is configured as an EV (electric vehicle) or may be implemented as an IC (internal combustion) engine powered fire engine 18 that may use electrical power for its water pumping operations.

Still referring to FIG. 1, the charging system 19b may also define the load 19. Charging system 19b has a BMS (battery management system) 21 that is operably connected to battery 23. The BMS 21 typically includes a charger and control components for monitoring and establishing and/or maintaining the battery's 23 charge state or other performance characteristics. BMS 21 has circuitry that includes corresponding hardware, firmware, and/or software, as well as conductors or other components for power and data or signal transmission that cooperate to monitor operational parameters of battery 23 and/or control various system functions to attenuate deviations from acceptable target values or ranges for the battery's 23 operating parameters, such as temperature, voltage, charge state, and others. BMS 21 may be implemented as a standalone system that manages battery 23 or as part of an overall control system of firefighting device 16. The battery 23 includes multiple connected cells and may be a component of a variety of systems in the firefighting system 10. Examples include the battery 23 as a DC power source used by the electric pumping system 20 or as a power source used by a propel system of an HEV, PHEV, or EV version of the fire engine 18. It is understood that if fire engine 18 includes an IC engine, battery 23 may be implemented as a starting battery for the IC engine. Typical configurations of batteries 23 include lithium-ion batteries or various lead and electrolyte configurations such as AGM (absorbent glass mat) sealed batteries.

Still referring to FIG. 1, water supply system 12 may receive its water from a municipal or other water source 26, represented here as a water tower 28. Water supply system 12 includes a plumbing system 28 with various pipe and/or tubes that connect the water source 26 for delivering water toward the fire engine 18. Electrical supply system 14 may receive its electrical power from a municipal power grid or other electrical power source 30, represented here as an AC (alternating current) power source 32. Electrical supply system 14 includes a wiring system 34 with various wires or conductors that connect the electrical power source 30 for delivering electrical power toward the fire engine 18.

Figure 2:
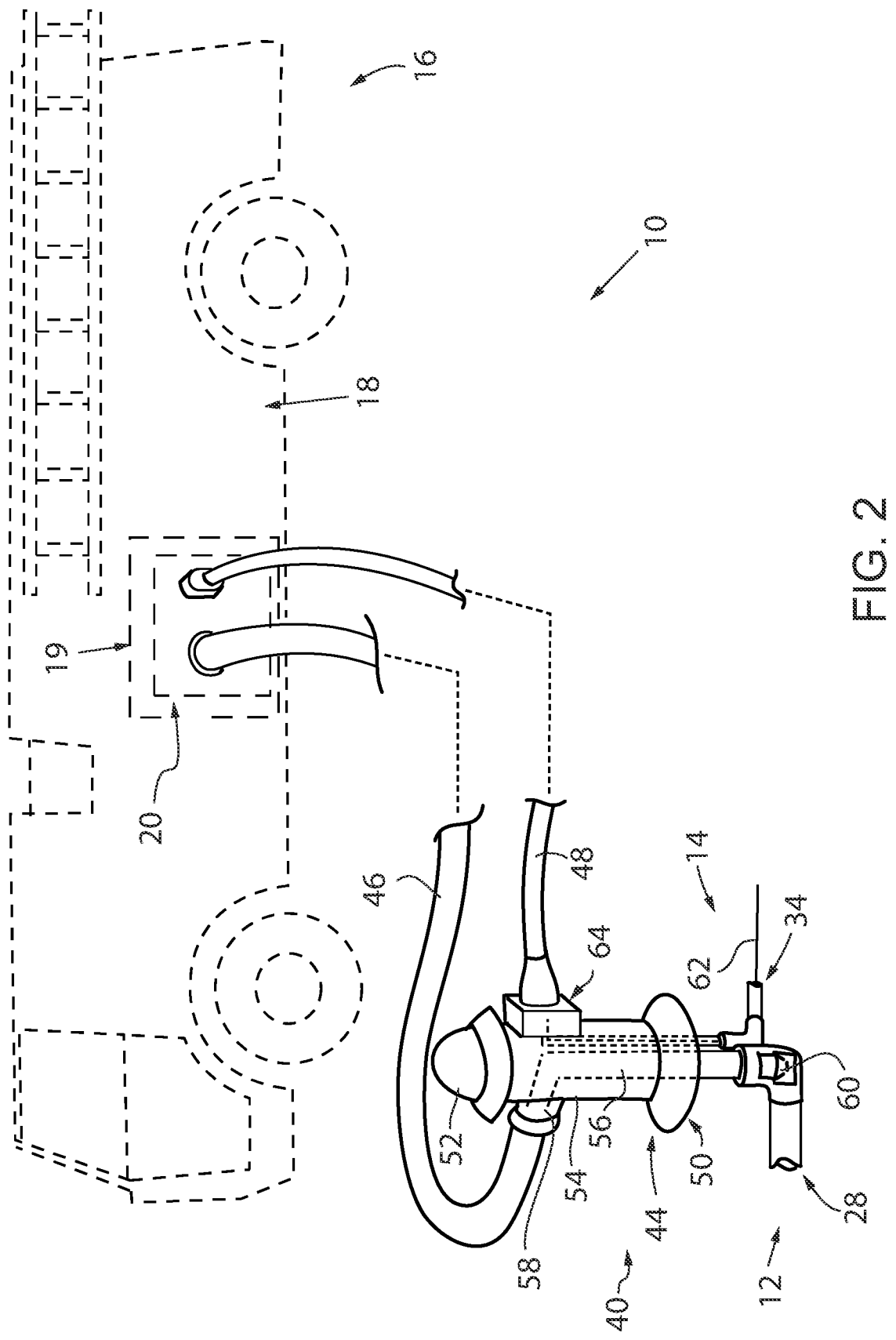
FIG. 2 is a schematic illustration of a water and electrical supply system for firefighting, according to another preferred embodiment.

Still referring to FIG. 1, as well as FIG. 2, system 10 may include a water/electrical connection arrangement 40 that brings components or features of the water and electrical supply systems 12, 14 near each other to provide interfaces or hookups for both of the water and electrical supply systems 12, 14 to a single, general, location, represented as a water/electrical connection location 42. Within the water/electrical connection location 42, the water/electrical connection arrangement 40 may be implemented as a single component, as illustrated here as a fire hydrant or hydrant 44. Hose 46 is shown extending between the hydrant 44 and fire engine 18 to connect the water supply system 12 to the electric pumping system 20. Accessory power cord 48 is shown extending between the hydrant 44 and fire engine 18 to connect the electrical supply system 14 to the electrical load 19.

Referring further to FIG. 2, hydrant 44 is shown here with a dry barrel hydrant configuration with a body 50 that includes a cap or dome-like bonnet 52 at the upper end of body 50 and barrel 54 that that is generally cylindrical and extends downwardly from bonnet 52. Barrel 54 defines an outer circumferential sidewall of body 50 that extends about and defines an outer periphery of a barrel passage 56. During use, water flows through the barrel passage 56 which is fluidly connected to at least one water outlet 58. Permitting or restriction flow of water through the barrel passage 56 may be controlled by actuating a valve 60. The valve 60 is configured to move between a seated position and an unseated position to selectively prevent or permit the water flow through the barrel passage 56 during corresponding non-use and in-use states of the system 10. Typically, the valve 60 is mounted below ground, for example, below a frost-line, and is manually actuated by rotating an operating nut (not shown) on top of bonnet 52 to correspondingly rotate an operating stem (not shown) that translates into linear movement of a stopper in valve 60, moving it toward or away from the valve seat.

Still referring to FIG. 2, the wires or conductors 62 of wiring system 34 are shown extending underground toward hydrant 44, then upwardly along the hydrant body 50 toward an electrical power coupling shown as connector assembly 64. The electrical connector assembly 64 provides the connection interface between the accessory power cord 48 and the electrical supply system 14.

Figure 3:
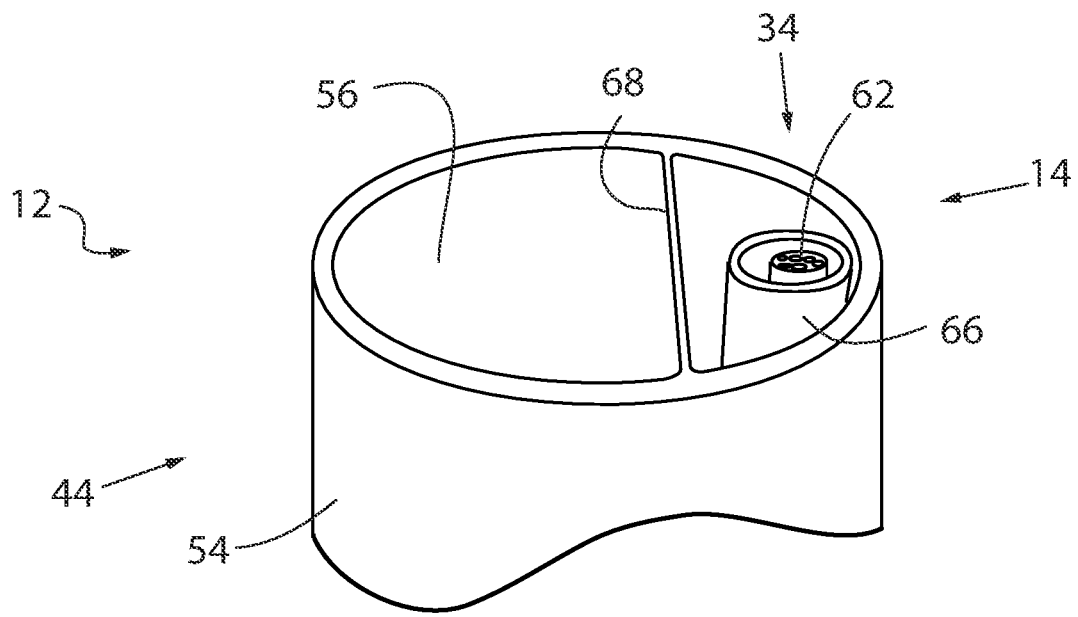
FIG. 3 is a schematic cross-sectional illustration of portions of the water and electrical supply system for firefighting, according to a further preferred embodiment.
Figure 4:
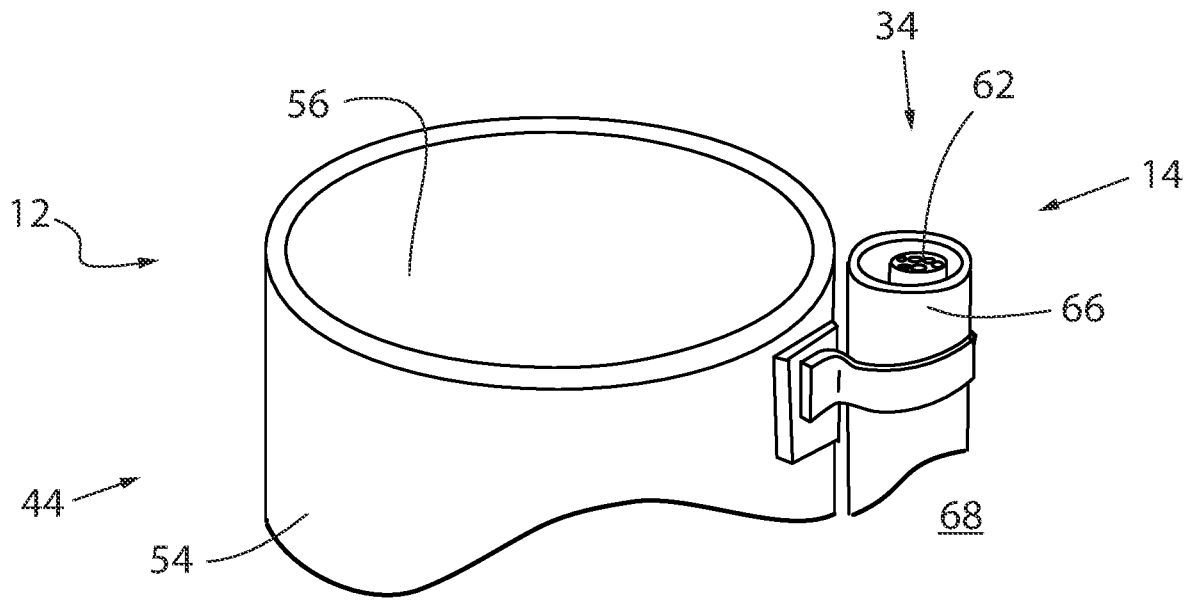
FIG. 4 is a schematic pictorial illustration of portions of a variant of the water and electrical supply system for firefighting of FIG. 3, according to a further preferred embodiment.

Referring now to FIGS. 3 and 4, conductors 62 are typically routed in a conduit 66. Hydrant 44 may include a conduit support 68 that at least partially locates the conduit or provides a mounting structure for securing the conduit 66 with respect to the hydrant barrel 54. FIG. 3 shows the conduit support as a divider wall within the interior of barrel 54, separating the space in which the conduit 66 is housed from the space in which the barrel passage 56 is defined, allowing for the internal mounting of conduit 66 and routing of conductors 62, inside of barrel 54. FIG. 4 shows the conduit support 68 as a structure(s) at an outer circumferential surface of the barrel's sidewall, allowing for the external mounting of conduit 66 and routing of conductors 62 with respect to the barrel 54.

Figure 5:
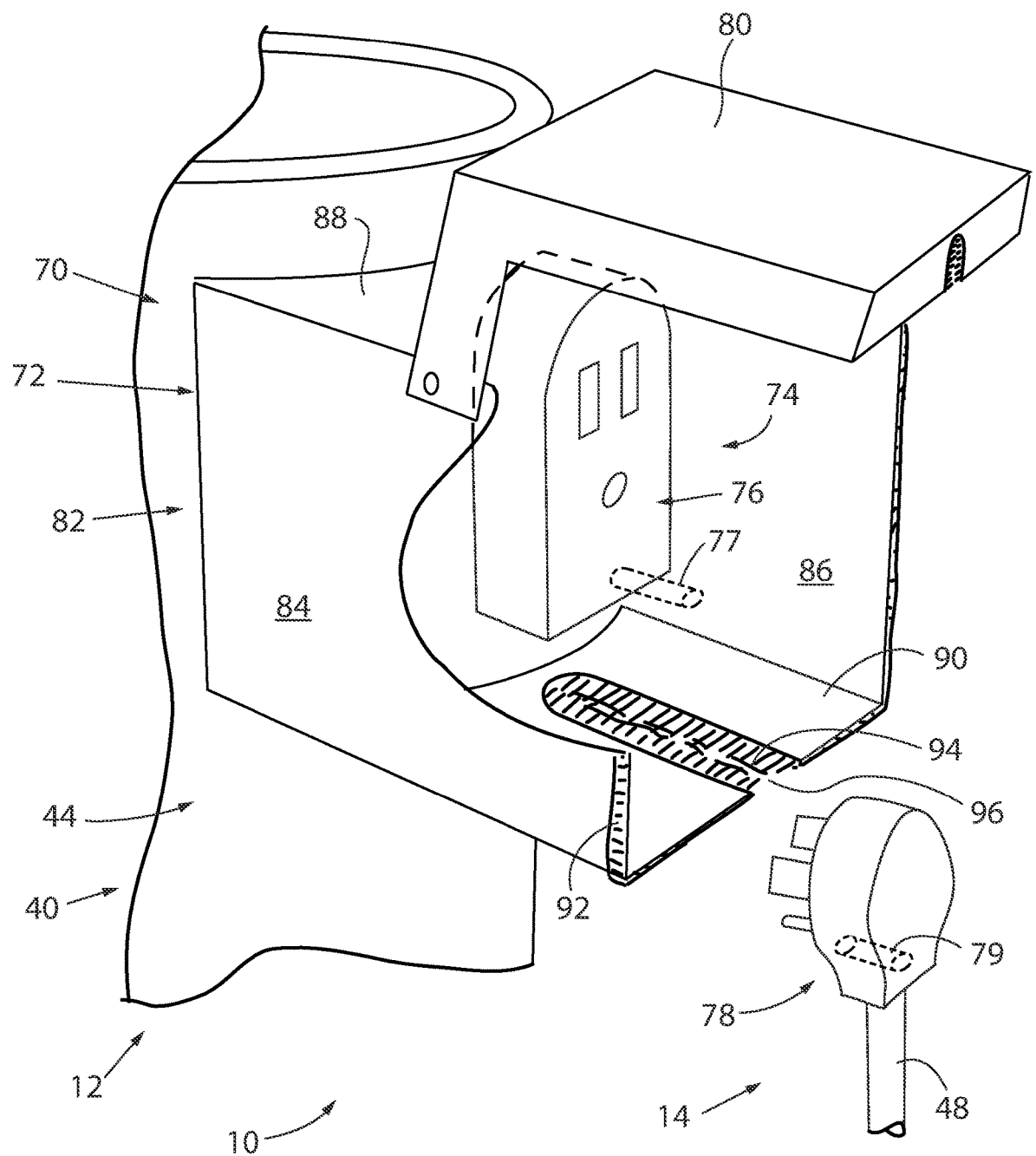
FIG. 5 is a schematic pictorial illustration of portions of a variant of the water and electrical supply system for firefighting, according to a further preferred embodiment.

Referring now to FIG. 5, regardless of the particular routing of conductors 62, the electrical connector assembly 64 typically includes a connector housing 70 that defines a housing enclosure 72 and an electrical connector 74 mounted inside of the connector housing 70. The electrical connector 74 may be defined by an electrical receptacle 76 that is configured to receive an electrical plug 78 of the accessory power cord 48. Although the receptacle 76 and plug 78 are represented with blade-type configurations, they may have pin-type or other configurations, including non-standard form factors or application-specific configurations for tamper-proofing or restricting access to the electrical connector 74. This may include lock-and-key features such as various cooperating structures, represented in FIG. 5 as projection 77 and opening 79.

Still referring to FIG. 5, connector housing 70 includes housing enclosure door 80 that is movable between open and closed positions. When the housing enclosure door 80 is in the open position, it exposes an opening of the connector housing 70 that permits access to the housing interior. When the housing enclosure door 80 is in the closed position, it covers the opening and blocks or restricts access to the housing interior. A housing enclosure main body 82 is defined by interconnected housing walls, shown here as side walls 84, 86, top wall 88, and bottom wall 90. Connector housing 70 typically includes various sealing arrangements or features that restrict ingress of water, particulates, or debris, into the interior of connector housing 70, represented here as enclosure door seal 92 and cord seal 94. The enclosure door seal 92 in this example is mounted at an exterior peripheral edge of the interconnected side, top, and bottom walls 84, 86, 88, 90, that extend about and define an outer boundary of the opening that permits access into the housing interior. Enclosure door seal 92 provides a sealed engagement of respective surfaces of the housing enclosure 72 and the housing enclosure door 80.

Figure 6:
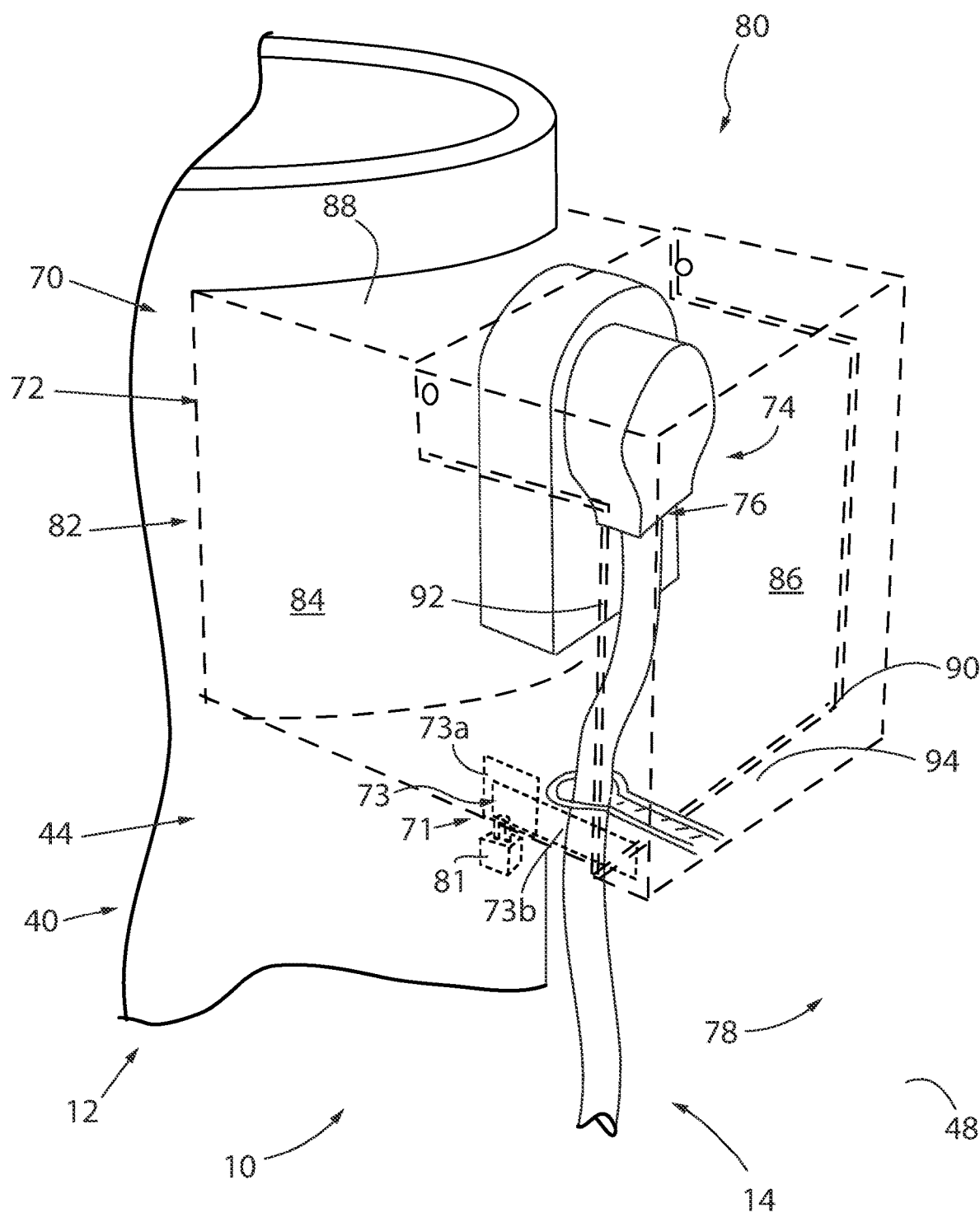
FIG. 6 is another schematic cross-sectional illustration of portions of a variant of the water and electrical supply system for firefighting, according to a further preferred embodiment.

Referring now to FIG. 6, the enclosure door seal 92 provides a sealed interface between the housing enclosure 72 and the housing enclosure door when the housing enclosure door 80 is in the closed position. The cord seal 94, shown here mounted in a cord opening 96 the enclosure bottom wall 90. The cord opening 96 is shown here as a slot that allows the accessory power cord 48, to extend through the enclosure bottom wall 90 when the housing enclosure door 80 is in the closed position. The cord seal 94 may be configured as, for example, a brush seal, split rubber seal, and/or other pass-through type seal that allows the accessory power cord 48 to be slid into the slot or otherwise into cord opening 96. Regardless, cord seal 94 provides a sealed engagement between the housing enclosure 72 and the outer circumferential surface of the accessory power cord 48. Connector housing 70 typically includes a lock system 71, shown here with hasp 73 with respective cooperating components 73a, 73b on the housing enclosure 72 and enclosure door 80. Lock 81 secures the hasp components 73a, 73b to each other to lock the enclosure door 80 to the housing enclosure 72 in the closed position, providing a tamper-proof configuration of the connector housing 70 or restricting access to the electrical connector 74.

Figure 7:
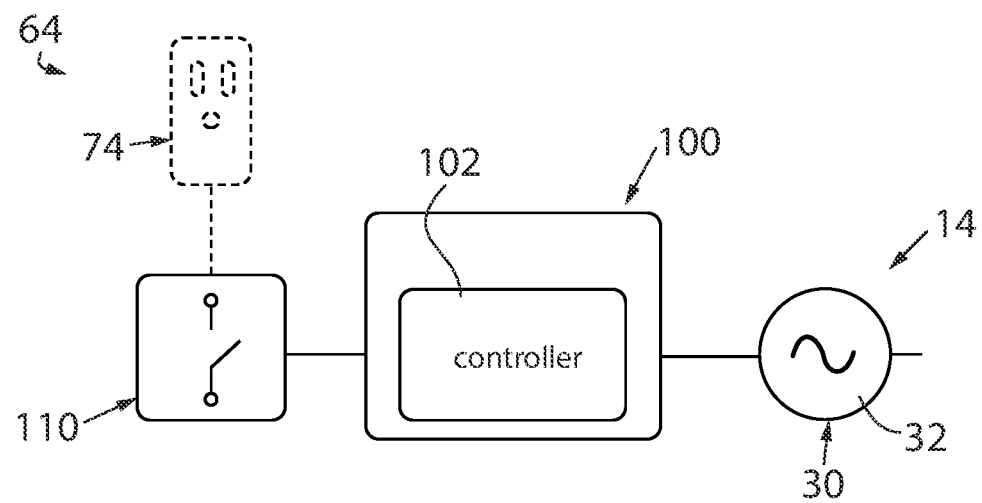
FIG. 7 is a schematic layout illustration of portions of a variant of the water and electrical supply system for firefighting, according to a further preferred embodiment.
Figure 8:
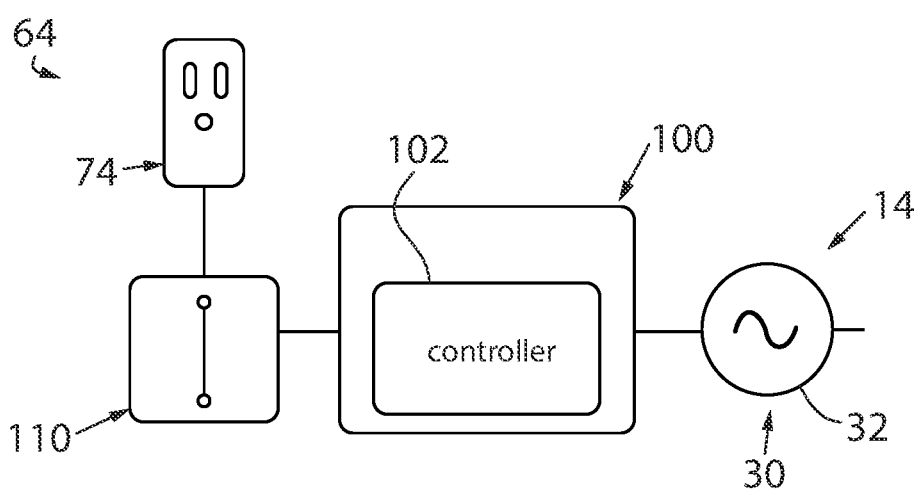
FIG. 8 is another schematic layout illustration of portions of a variant of the water and electrical supply system for firefighting, according to a further preferred embodiment.

Referring now to FIGS. 7 and 8, system 10 may be configured so that in a default non-use state, the electrical connector 74 is de-energized. The electrical connector 74 may be energized or brought online when there is a need for electrical power by, for example, an electric pumping system 20, such as during a firefighting event. This may be accomplished with a control system 100 that can receive a user instruction to energize the electrical connector 74 and send a corresponding command to cooperating components within system 10. Control system 100 may include a controller 102 such as a computer that executes various stored programs while receiving inputs from and sending commands to control the electrification or energization state of electrical connector 74. A switch mechanism shown as switch 110 may be provided outside of the electrical connector assembly 64, which also may be outside of the water/electrical connection arrangement 40. Referring now to FIG. 7, switch 110 may implement a relay, solenoid, contactor, and/or other switching device(s) that is, for example, normally open or bistable and left in an open configuration by default to allow the electrical connector 74 to be correspondingly de-energized by default. Referring now to FIG. 8, when a firefighting procedure begins that requires electrically powering an electric pumping system 20, upon the user's instruction or other input to the control system 100 that electrical power is required through the electrical connector 74, control system 100 sends a control signal to switch 110, which actuates the switch and energizes the electrical connector 74.

Figure 9:
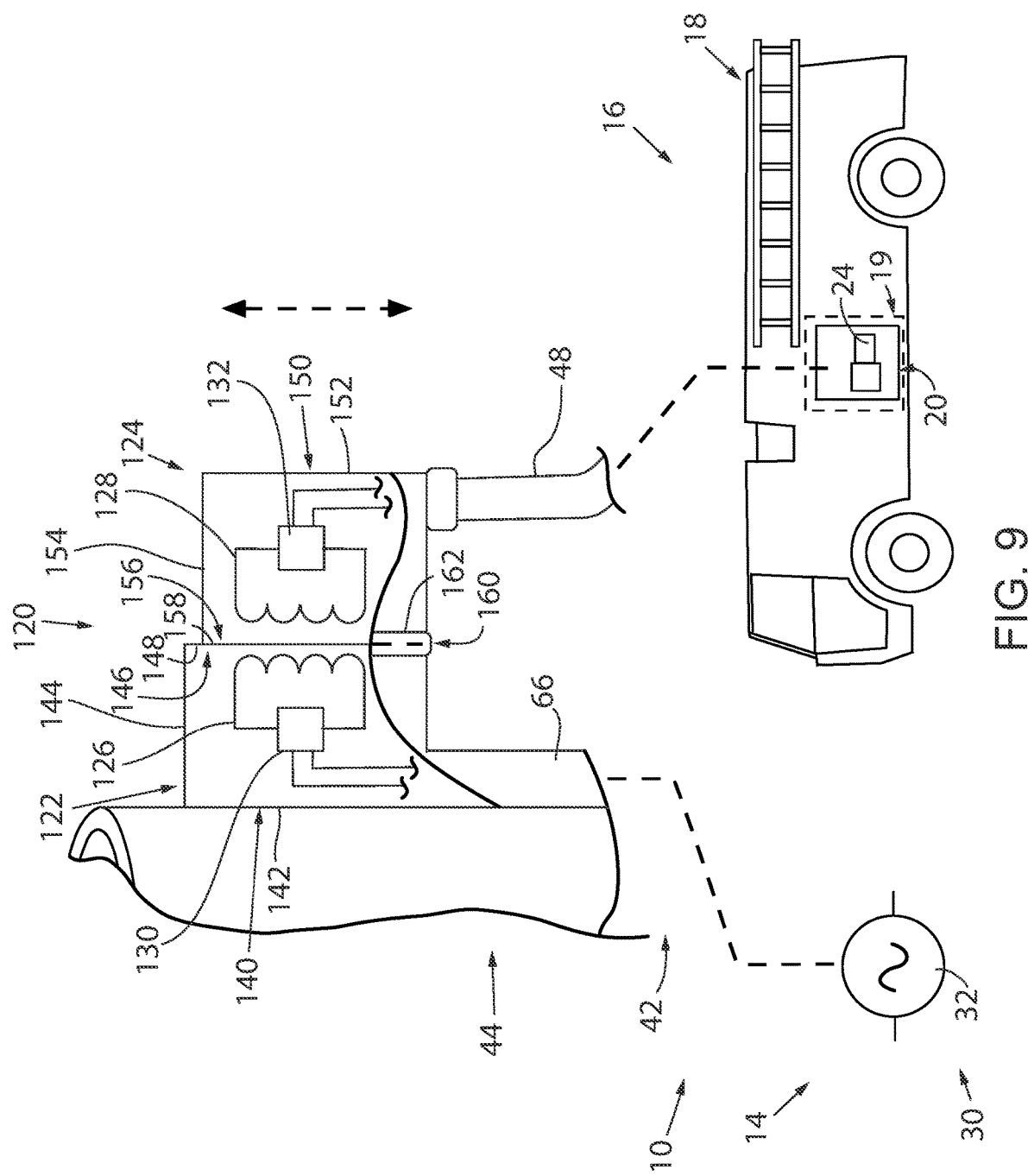
FIG. 9 is another schematic layout illustration of portions of a variant of the water and electrical supply system for firefighting, according to a further preferred embodiment.
Figure 10:
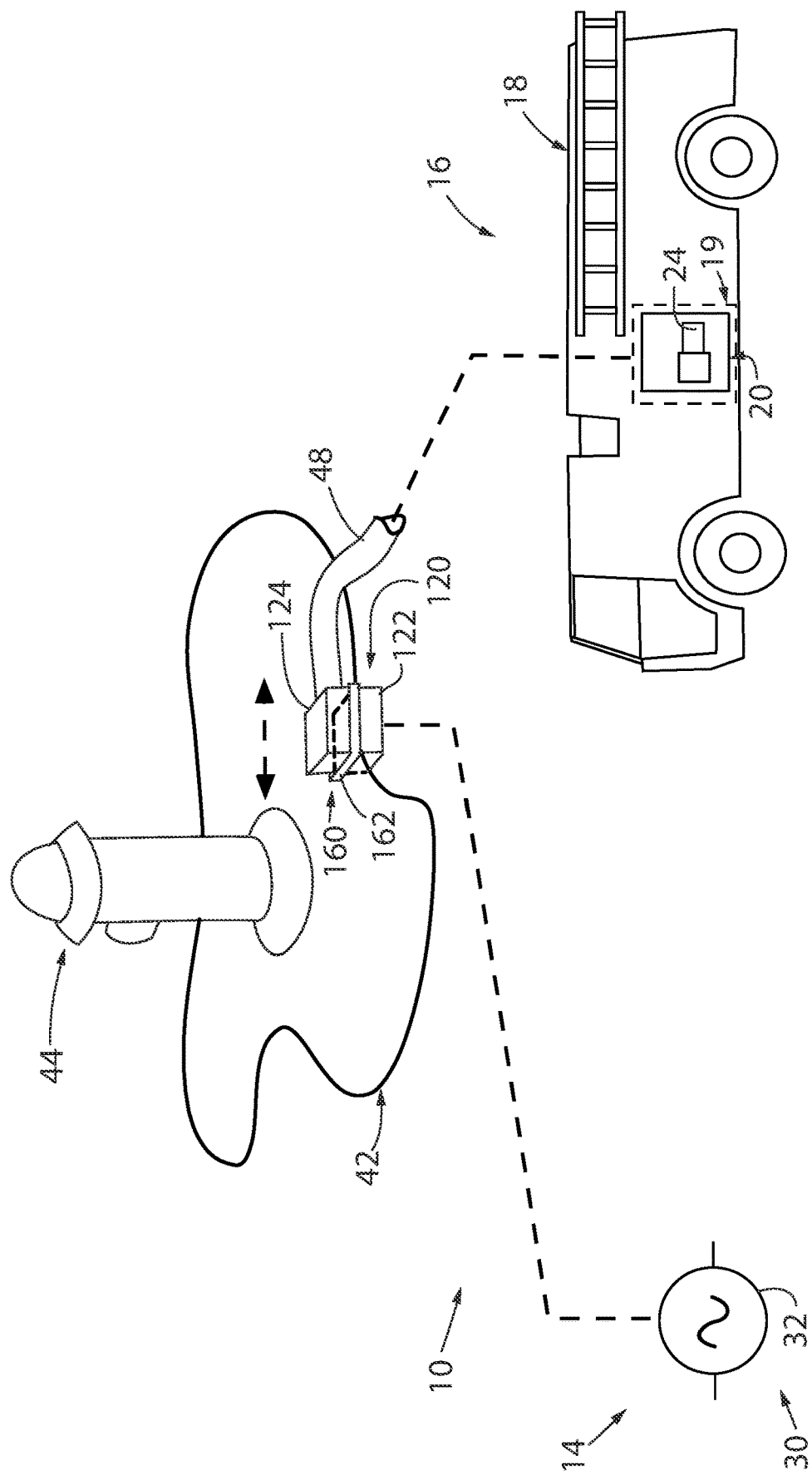
FIG. 10 is another schematic layout illustration of portions of a variant of the water and electrical supply system for firefighting, according to a further preferred embodiment.

Referring now to FIGS. 9-10, instead of an electrical power coupling configured for mechanical coupling of conductors through electrical connector 74 for electrical power transmission, system 10 may include an electrical power coupling that is configured for wireless electrical power transmission. System 10 in FIG. 9 includes a wireless power transmission arrangement 120 that has first and second pads, shown as a base pad or primary pad 122 and a cord pad, vehicle pad, or secondary pad 124 that cooperate for inductive electrical power transfer from the electrical supply system 14 to the power accessory cord 48. A primary or transmitting coil 126 is mounted in the primary pad 122 and is electrically connected to the electrical supply system 14 or receives line power that supplies a driving voltage to the primary or transmitting coil 126. A secondary or receiving coil 128 is mounted in the secondary pad 124 and is electrically connected to the accessory cord 48. Each of the transmitting and receiving coils 126, 128 has a longitudinal axis about which multiple turns of a conductor, typically a copper wire, are wound to form the coil(s) 126, 128. Typically, the transmitting and receiving coils 126, 128 are of comparable area with diameters that may be greater than two inches. One or both of the transmitting and receiving coils 126, 128 may include cooperating power processing circuitry. The power processing circuitry, shown as circuitry 130, 132 that is respectively incorporated into the base and cord pad(s) 122, 124, may be configured to process or condition the AC waveform to ensure its suitability for use by electric motor 24 of electric pumping system 20.

Still referring to FIG. 9, primary pad 122 has a body 140 defined by interconnected walls, shown here as back wall 142, side walls 144, and a front wall 146 that provides an interacting surface or contact face 148 of the secondary pad 124. Like primary pad 122, secondary pad 124 also has a body 150 defined by interconnected walls, including back wall 152, side walls 154, and a front wall 156 that provides an interacting surface or contact face 158 of the secondary pad 124. The bodies 140, 150 of each of primary pad 122 and secondary pad 124 are typically made from a polymeric material as potting material or an encapsulating material that surrounds and mounts the transmitting coil 126 and receiving coil 128 within the body. The transmitting coil 126 and receiving coil 128 are mounting adjacent and with their axes perpendicular to the contact faces 148, 158. During use, the contact faces 148, 158 engage each other with the transmitting and receiving coils 126, 128 aligned with each other and separated by a short distance, typically less than one inch such as one-half inch or less, with the distance being sufficiently far to provide electrical isolation of the transmitting and receiving coils 126, 128 while also being sufficiently close to allow for inductive power transmission from the transmitting coil 126 to the receiving coil 128.

Still referring to FIG. 9, alignment and relative positions of the primary pad 122 and secondary pad 124 may be maintained with an alignment and/or mounting arrangement, shown here as coupler 160. The coupler 160 may include cooperating structures that hold the contact faces 148, 158 in face-to-face abutment to ensure the alignment and/or other positional relationship(s) of the transmitting and receiving coils 126, 128 to allow the induction-based or wireless electrical power transmission from the electrical supply system 14 to the power cord 48. Coupler 160 may include a collar 162 mounted to and extending outwardly from the perimeter of the base pad's front wall 146. Collar 162 may define an open top or other portion that permits access to side channels, rails, or other guides that receive cooperating side rails, channels, or other guides or structure(s) of the secondary pad 124. This arrangement allows secondary pad 124 to be mounted for use against the primary pad 122 by sliding the secondary pad 124 downwardly or vertically into the collar 162 to align the transmitting and receiving coils 126, 128 with each other in close proximity for electrical induction. When use of system 10 is completed, the secondary pad 124 may be removed from its coupling with primary pad 122 by sliding it upwardly and out of the collar 162. The coupling and uncoupling of the base and cord pads 122, 124 is schematically represented by the dashed vertical arrow to the right of secondary pad 124 in FIG. 9.

Referring now to FIG. 10, primary pad 122 may be within the water/electrical connection location 42 while also being spaced from the hydrant 44. The distance between the primary pad 122 and hydrant 44 is typically less than 10 feet, for example, about 6 feet, about 4 feet, or about 2 feet of spacing. The primary pad 122 of FIG. 10 is shown mounted in a recessed manner in the ground surface, so that the base pad's contact face 48 sits flush or coplanar with the ground surface. In this arrangement, the secondary pad 124 is mounted for use against the primary pad 122 by sliding the secondary pad 124 horizontally into the collar 162, as schematically indicated by the dashed horizontal arrow, to align the transmitting and receiving coils 126, 128 with each other in close proximity for electrical induction.

Figure 11:
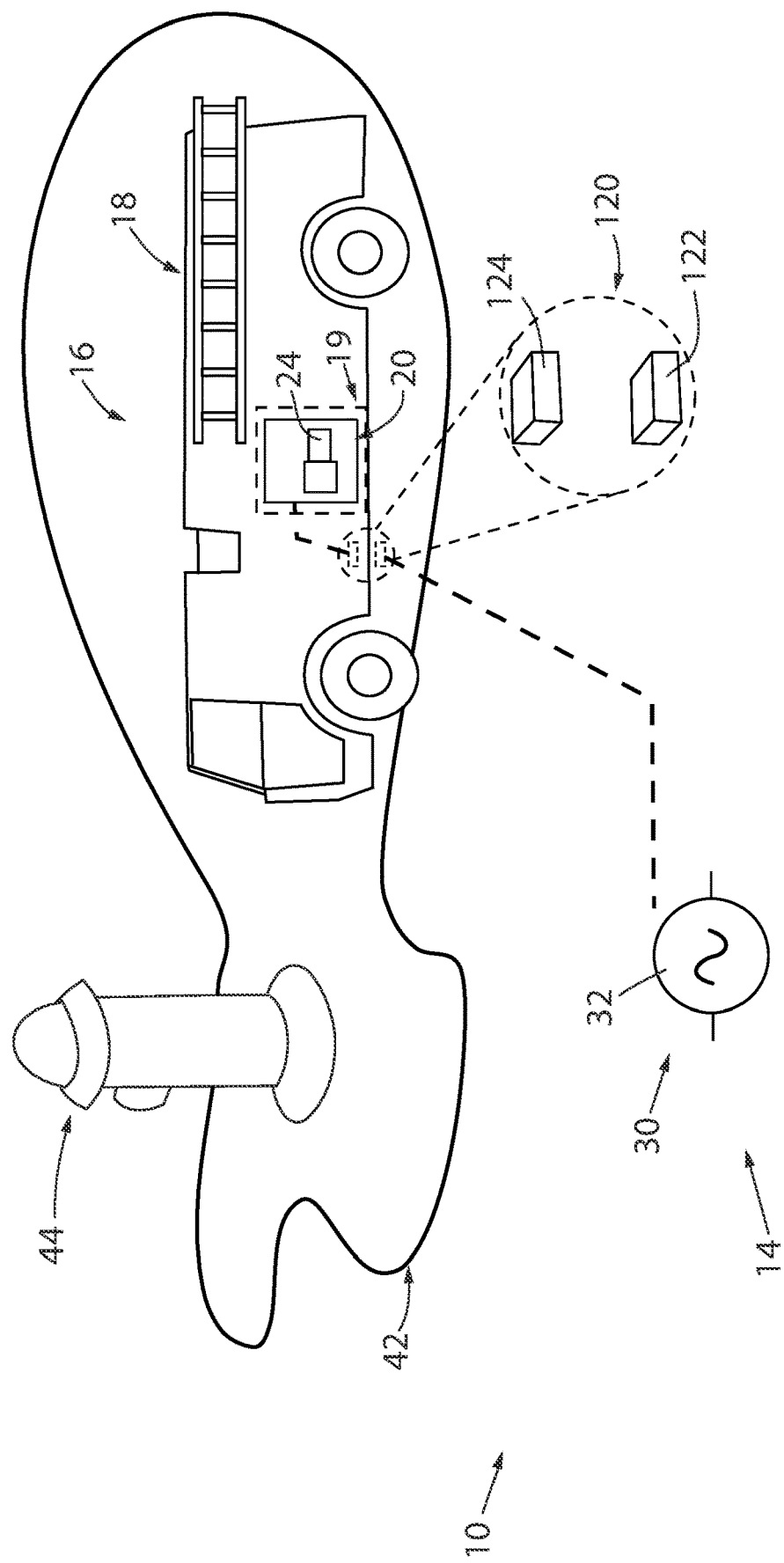
FIG. 11 is another schematic layout illustration of portions of a variant of the water and electrical supply system for firefighting, according to a further preferred embodiment.

Referring now to FIG. 11, system 10 is similar to that shown in FIG. 10, only the primary pad 122 and secondary pad 124 do not interlock with each other, like those shown in FIG. 10 by way of collar 162. Instead, primary and secondary pads 122, 124 are maintained in a spaced-apart relationship with each other during the wireless power transmitting session of the firefighting event. Secondary pad 124 may be integrated into the fire engine 18 or other firefighting device 16 at a fixed location, typically supported at a lower portion of the fire engine's chassis. In this implementation, alignment between the primary and secondary pads 122, 124 may be achieved by an operator of the fire engine 18 driving the fire engine to a location within the water/electrical connection location 42 at which the secondary pad 124 overlies the primary pad 122. At this point, the vertical and/or other spacing distance(s) between the primary and secondary pads 122, 124 are sufficiently small to permit wireless or inductive electrical power transfer from the electrical supply system 14 between respective transmitting and receiving coils within the primary and secondary pads 122, 124 to energize the electric motor 24 of electric pumping system 20.

Although described primarily with respect to the energization of the electric motor 24 of electric pumping system 20, it is understood that the electrical supply system for a firefighting system 10 may instead or in addition to be implemented for battery maintenance or charging in order to maintain or increase a charge state of one or more batteries with the firefighting device 16.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

We claim:

1. A water and electrical supply system for firefighting, comprising:
   a water supply system configured to convey water from a water source to a hose for performing a firefighting task, the water supply system including:

a water inlet that receives the water from the water source in an upstream direction; and a water outlet that releases the water from the water supply system in a downstream direction;

an electrical supply system configured to provide electrical power for performing a firefighting task, the electrical supply system including:

a set of conductors for electrically connecting the electrical supply system to an electrical power source;

wherein the water supply system comprises:

a fire hydrant that includes:

a barrel that extends upwardly from a ground surface, the barrel defining a barrel passage through which the water flows during use of the system;

a valve configured to move between a seated position and an unseated position to selectively prevent or permit the water flow through the barrel during corresponding non-use and in-use states of the system; and at least one water outlet in fluid communication with the barrel passage to direct water out of the fire hydrant in a downstream direction toward a firefighting device;

wherein the set of electrical conductors defines a set of power source conductors and the electrical supply system comprises:

an electrical connector assembly that includes:

a connector housing that is sealed out of fluid communication with respect to the barrel passage; and an electrical connector that is:

mounted within the connector housing; and configured to selectively couple to an accessory power cord for providing electrical power to an electric firefighting accessory; and wherein the connector housing is supported by the fire hydrant.

2. The system of claim 1, wherein:

the connector housing includes interconnected housing walls that extend about a housing interior in which the electrical connector is mounted, and at least one of the interconnected housing walls is defined by a portion of the fire hydrant that provides a barrier between the barrel passage and the housing interior.

3. The system of claim 2, wherein the connector housing comprises:

a housing enclosure main body defined at least partially by the interconnected housing walls;

a housing enclosure door that defines:

an open position that permits access to the housing interior;

a closed position that prevents access to the housing interior;

an enclosure door seal arranged between the housing enclosure and the housing enclosure door that provides a sealed interface between the housing enclosure and the housing enclosure door when the housing enclosure door is in the closed position.

4. The system of claim 3, wherein the connector housing further comprises:

a cord seal mounted to at least one of the housing enclosures and the enclosure door to provide a sealed interface between the at least one of the housing enclosures and the enclosure door and the accessory power cord when the accessory power cord is connected to the electrical connector.

5. The system of claim 4, wherein the enclosure door seal provides a liquid-tight seal between the housing enclosure and the housing enclosure door when the housing enclosure door is in the closed position.

6. The system of claim 5, wherein:

the housing enclosure includes a lower wall with a cord opening defined through the lower wall and through which the accessory power cord extends during use of the system; and the cord seal is arranged at the cord opening of the housing enclosure lower wall to provide a sealed interface between the cord and the housing enclosure lower wall.

7. The system of claim 1, wherein the electrical supply system includes: a first electrical coil that defines a transmitting coil mounted at a water/electrical connection; and a second electrical coil that defines a receiving coil mounted to the firefighting device; and wherein the transmitting coil and the receiving coil are selectively aligned with respect to each other to inductively transmit electrical power from the transmitting coil to the receiving coil for providing electrical power that supports an electrical load defined by the firefighting device.

8. The system of claim 7, wherein the electrical load is defined by energizing an electrical firefighting accessory.

9. The system of claim 7, wherein the electrical load is defined by charging a battery of the firefighting device.

* * * * *